US010208253B2

(12) United States Patent
McNamara et al.

(10) Patent No.: US 10,208,253 B2
(45) Date of Patent: Feb. 19, 2019

(54) PYROLYSIS REACTOR SYSTEMS

(71) Applicant: PLASTIC ENERGY LIMITED, London (GB)

(72) Inventors: David McNamara, London (GB); Michael Murray, Killiney (IE)

(73) Assignee: Plastic Energy Limited, London (GB)

( * ) Notice: Subject to any disclaimer, the term of this patent is extended or adjusted under 35 U.S.C. 154(b) by 97 days.

(21) Appl. No.: 15/506,566

(22) PCT Filed: Aug. 27, 2015

(86) PCT No.: PCT/EP2015/069639
§ 371 (c)(1),
(2) Date: Feb. 24, 2017

(87) PCT Pub. No.: WO2016/030460
PCT Pub. Date: Mar. 3, 2016

(65) Prior Publication Data
US 2017/0233657 A1 Aug. 17, 2017

(30) Foreign Application Priority Data

Aug. 28, 2014 (EP) .................................... 14182622

(51) Int. Cl.
*C10B 43/04* (2006.01)
*C10B 1/04* (2006.01)
(Continued)

(52) U.S. Cl.
CPC ............ *C10B 43/04* (2013.01); *B01D 5/0012* (2013.01); *C10B 1/04* (2013.01); *C10B 7/10* (2013.01);
(Continued)

(58) Field of Classification Search
CPC .. C10B 1/04; C10B 7/10; C10B 43/04; C10B 47/18; C10B 47/34; C10B 47/44; C10B 53/07; C10G 1/10; F23G 7/12
See application file for complete search history.

(56) References Cited

U.S. PATENT DOCUMENTS

| 1,904,380 A | 4/1933 | Morrell et al. |
| 2002/0134244 A1 | 9/2002 | Gu |
| 2013/0192973 A1* | 8/2013 | Rolston .................. B29B 17/04 201/25 |

FOREIGN PATENT DOCUMENTS

| FR | 2 425 258 A1 | 12/1979 |
| GB | 2 488 302 B | 11/2013 |
| WO | 2011/034446 A1 | 3/2011 |

OTHER PUBLICATIONS

InternationalPreliminary Report on Patentability issued in PCT/EP2015/069639; dated Feb. 28, 2017.
(Continued)

*Primary Examiner* — Brian A McCaig
(74) *Attorney, Agent, or Firm* — Studebaker & Brackett PC

(57) ABSTRACT

A pyrolysis reactor system includes a reactor and a contactor mounted above the reactor. The reactor has a shell, an inlet and an outlet. A central shaft runs along its axis and supports agitation blades in a counter-helical arrangement, and an auger. Rotation of the auger in one direction feeds feedstock into the vessel, and in the opposite direction removes char at the end of a batch. The contactor includes four elements with a frusto-conical part supported on vertical support arms, and being connected to a disc by legs. The contactor elements allow short chains to pass through apertures while long chains condense on their surfaces or on the vessel wall
(Continued)

surface. There is dynamic tuning of carbon number of gases flowing downstream by active temperature and pressure control at the contactor.

15 Claims, 8 Drawing Sheets

(51) Int. Cl.
*C10B 7/10* (2006.01)
*C10B 47/18* (2006.01)
*C10B 47/34* (2006.01)
*C10B 47/44* (2006.01)
*C10B 53/07* (2006.01)
*C10G 1/10* (2006.01)
*F23G 7/12* (2006.01)
*F23G 5/027* (2006.01)
*B01D 5/00* (2006.01)

(52) U.S. Cl.
CPC .............. *C10B 47/18* (2013.01); *C10B 47/34* (2013.01); *C10B 47/44* (2013.01); *C10B 53/07* (2013.01); *C10G 1/10* (2013.01); *F23G 5/027* (2013.01); *F23G 7/12* (2013.01); *F23G 2201/301* (2013.01); *F23G 2201/40* (2013.01); *F23G 2900/50205* (2013.01); *Y02P 20/143* (2015.11)

(56) References Cited

OTHER PUBLICATIONS

International Search Report issued in PCT/EP2015/069639; dated Nov. 3, 2015.

\* cited by examiner

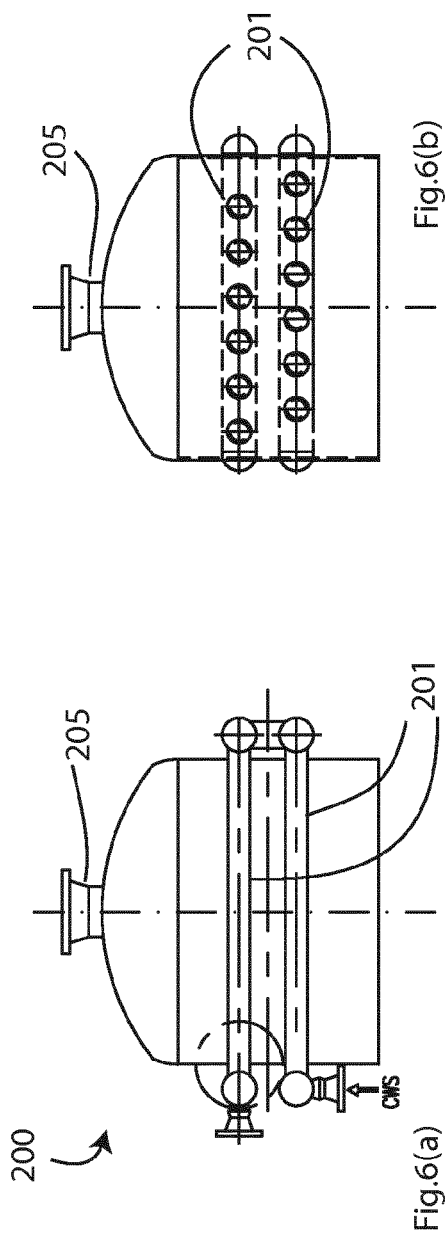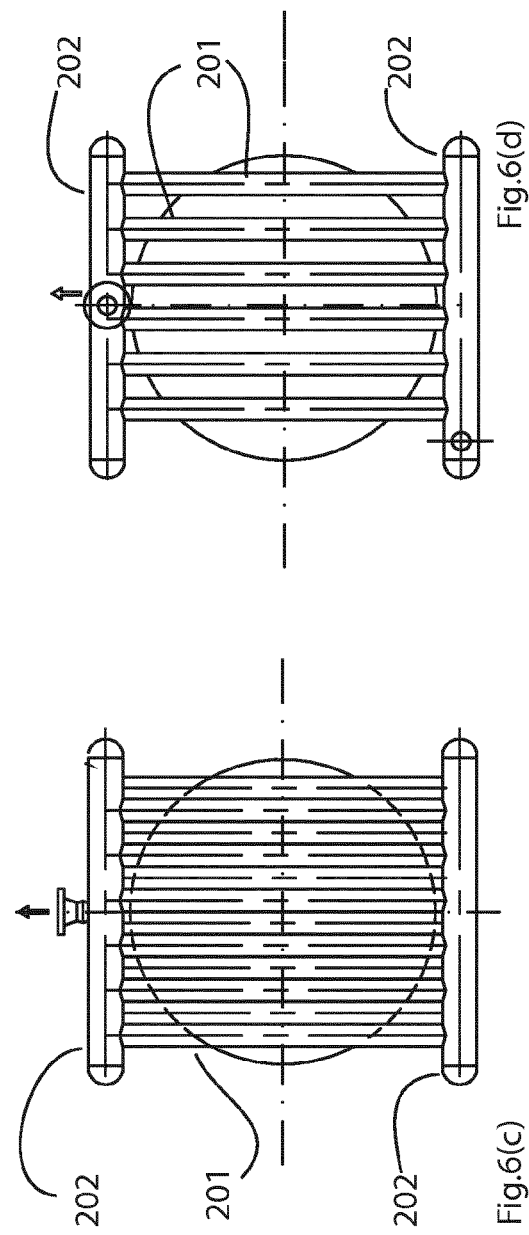

PYROLYSIS REACTOR SYSTEMS

FIELD OF THE INVENTION

The invention relates to pyrolysis reactors.

Our prior British patent no GB2488302B describes a system for conversion of waste plastics to fuel. It has a reactor above which a contactor has a bank of condenser elements on which long-chain gas components condense and fall back into the reactor.

The present invention is directed towards providing an improved system.

SUMMARY OF THE INVENTION

According to the invention, there is provided a pyrolysis reactor system comprising a reactor and a contactor mounted above the reactor, wherein the contactor comprises at least one contactor element mounted within a vessel having a wall and being arranged for flow of long-chain gas components back into the reactor,
- wherein the contactor elements include at least one perforated element which is sloped upwardly and radially towards the vessel wall,
- wherein the vessel has a jacket surrounding the contactor element or elements, and
- wherein the jacket has a lower inlet and an upper outlet and a pump for pumping a heat exchange fluid into and around the jacket.

In one embodiment, at least one perforated contactor element has a conical or frusto-conical shaped component, with its apex facing downwards towards the reactor. In one embodiment, said component is frusto-conical with a central hole at its apex.

In one embodiment, there is a baffle plate mounted below the apex. In one embodiment, said baffle plate is disc-shaped.

In one embodiment, at least one contactor element has a conical or frusto-conical shape will an apex facing downwards, and the upper edge is adjacent the vessel inner surface. In one embodiment, there are two or more contactor elements.

In one embodiment, the system further comprises a temperature controller configured to pump coolant into the jacket inlet at a temperature chosen according to desired carbon chain length condensation within the contactor.

In one embodiment, the system further comprises a pressure controller configured to control pressure in the contactor according to desired carbon chain length condensation within the contactor.

In one embodiment, the contactor further comprises an upper chamber above the contactor element or elements, said upper chamber having a heat exchanger for providing a desired uniform temperature of gases exiting the contactor.

In one embodiment, the heat exchanger comprises tubes extending across a gas path in the upper chamber, and means for pumping a cooling liquid through the heat exchanger.

In one embodiment, the reactor is arranged with a longitudinal axis directed upwardly towards the contactor, and a feedstock inlet is at its lower end, and wherein the reactor comprises an auger arranged to deliver feedstock into the reactor vessel when rotating in one direction, and for delivering char out through the feedstock inlet when rotating in the opposite direction.

In one embodiment, the reactor comprises agitation blades (for rotating on a central shaft in close proximity to a reactor vessel inner surface at a lower end of the reactor.

In one embodiment, there are counter-helical agitation blades. In one embodiment, the agitation blades are supported on radial arms. In one embodiment, the agitation blades only extend upwardly for a limited part of the longitudinal axis from the feedstock inlet.

In one embodiment, a lower blade is arranged to scrape char from a lower domed vessel wall.

In one embodiment, said lower blade is supported by radial arms extending from a central shaft and by brackets extending in the longitudinal direction from the lower blade to a radial arm at a location on said radial arm between the shaft and the vessel wall. In one embodiment, the reactor outlet (4) is offset from the longitudinal axis.

In another aspect, the invention provides a method of operation of a reactor system comprising a reactor and a contactor mounted above the reactor, wherein the contactor comprises at least one contactor element mounted within a vessel having a wall and being arranged for flow of long-chain gas components back into the reactor, wherein the contactor elements include at least one perforated element which is sloped upwardly and radially towards the vessel wall, wherein the vessel has a jacket surrounding the contactor element or elements, and wherein the jacket has a lower inlet and an upper outlet and a pump for pumping a heat exchange fluid into and around the jacket, the method comprising:
- dynamically tuning composition of outlet gases according to molecular string size by controlling contactor temperature.

In one embodiment, said temperature control is performed by selecting temperature and flow rate of coolant pumped into said jacket lower inlet.

In one embodiment, the controller also controls contactor pressure for said dynamic tuning.

In one embodiment, the method comprises increasing temperature and decreasing pressure to achieve longer length chains. In one embodiment, the temperature control is performed within a temperature range of 240° C. to 300° C. In one embodiment, the pressure control is performed within a pressure range of −150 mBar to +350 mBar. In one embodiment, the pressure control is achieved by management of back-pressure downstream of the contactor.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:

FIGS. 3(a) to 3(d) is a set of views of a contactor for mounting above the pyrolysis reactor in which:

FIG. 3(a) is a front view;

FIG. 3(b) is an elevation cross-section view in the B-B direction;

FIG. 3(c) is a plan cross-sectional view in the C-C direction; and

FIG. 3(d) is a plan cross-section view in the D-D direction;

FIGS. 6(a) to 6(d) are a set of views showing an optional heat exchanger for fitting at the upper end of the contactor, in which:

FIG. 6(a) is a side view;

FIG. 6(b) is a side view with a manifold shown only in interrupted lines, in the direction of tubes;

FIG. 6(c) is a plan view with the domed top removed, and

FIG. 6(d) is a top plan view from between the upper and lower tubes; and

DESCRIPTION OF THE EMBODIMENTS

Figure 1:
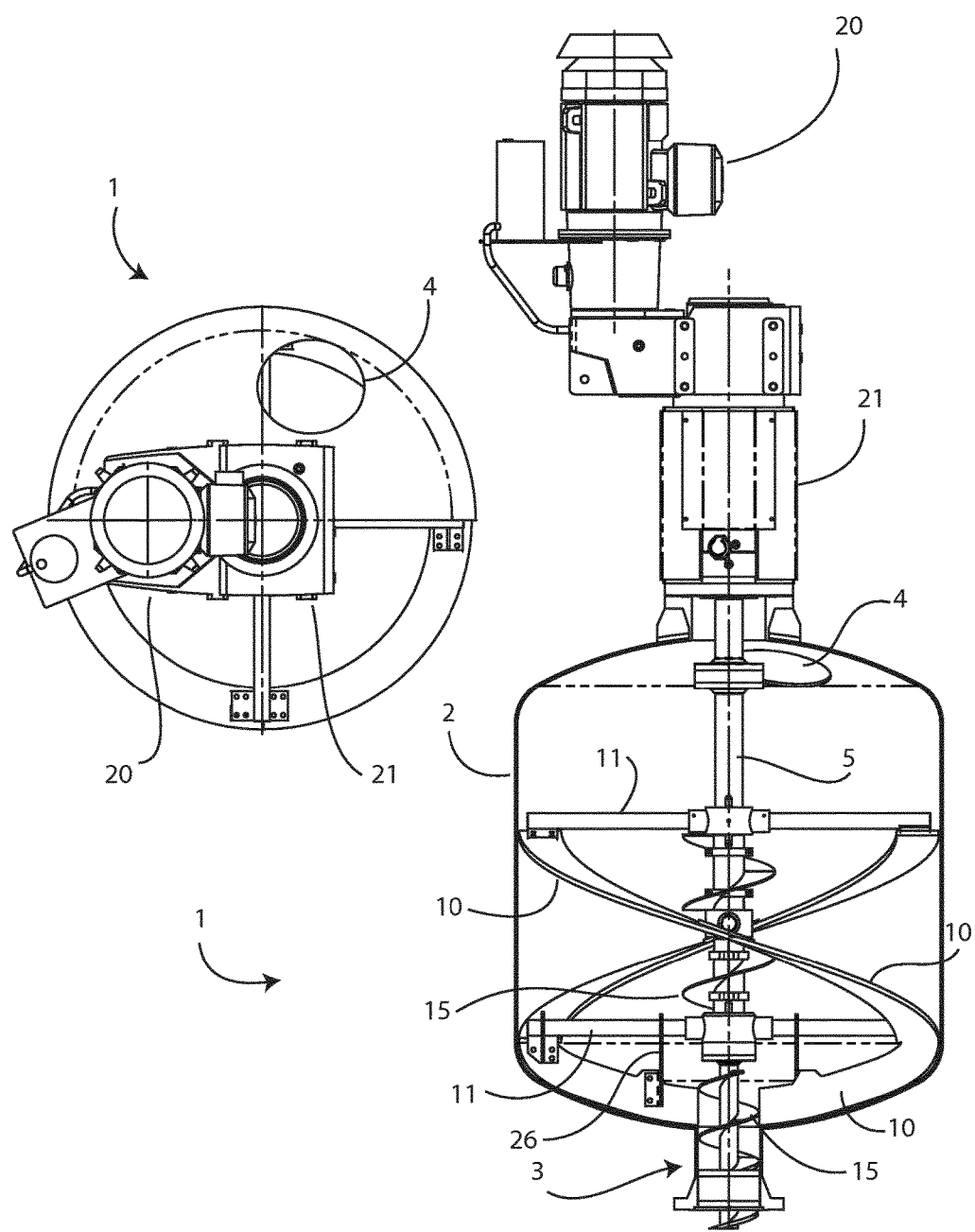
FIG. 1 is a cut-away front view and a plan view of a pyrolysis reactor of a system of the invention.
Figure 2:
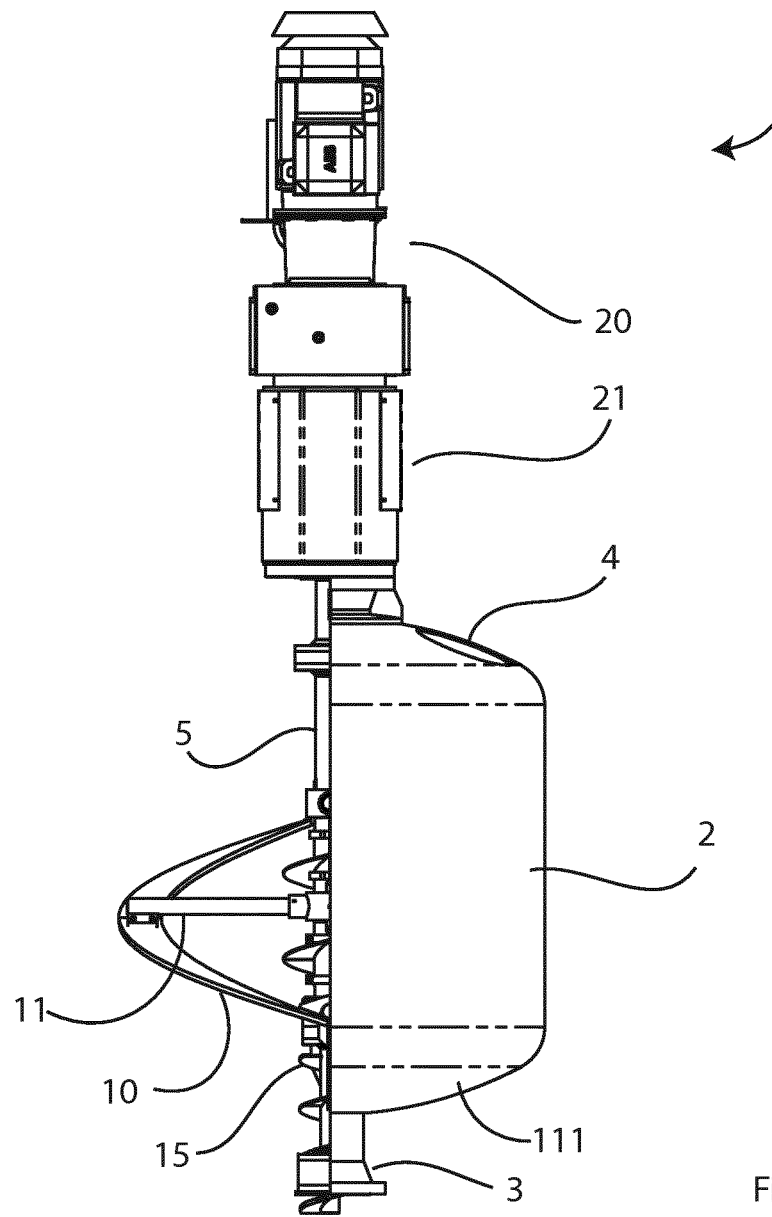
FIG. 2 is a view showing internal components on the left side and an external view on the right side.

Referring to FIGS. 1 and 2 a pyrolysis reactor 1 is illustrated, for use in a system such as that of the type described in GB2488302B. The reactor 1 has a shell 2, an inlet 3 and an outlet 4. A central shaft 5 runs along its axis and supports:
- agitation blades 10 in a counter-helical arrangement and being positioned to scrape the internal surface of the skin 2,
- radial arms 11 supporting the agitation blades 10, and
- an auger 15.

There are also brackets 26 connecting the lower radial arm 11 to the lower blade 10, which scrapes the internal surface of the bottom dome of the shell 2. This provides additional strength for scraping and delivering char out of the reactor 1 via the feedstock inlet 3 when the auger 15 rotates in a direction to pump char downwardly.

Above the outlet 4 there is a motor 20, and a gearbox 21 driving the shaft 5. The reactor outlet 4 is offset from the longitudinal axis, and is linked with a contactor 100 directly. This allows the reactor 1 and the contactor to be integrated, with flow of gases up through the outlet 4 and a pipe into the contactor 100, and flow of long chain hydrocarbons back into the reactor 1.

A controller of the reactor 1 is arranged inter alia to rotate the shaft 5 to deliver waste plastics or other feedstock into the reactor via the inlet 3, by action of the auger 15. Advantageously, at the end of a batch the direction is reversed, causing char to be removed via the inlet 3. Because the reactor 1 is mounted with its axis vertical, there is the advantage of char continuously dropping to the bottom as it forms and is scraped by the blades 10. The arrangement of the lower radial supports 11 and the brackets 26 allow particularly effective char scraping and agitation in the bottom of the reactor.

The agitation blades 10 are manufactured to a tolerance which maintains their outer edges at or close to a gap of 5 mm to 8 m from the internal surface of the shell 2. Accordingly, they achieve very effective agitation and cleaning of the shell inner surface. This contributes to the action of directing char into the central lower end of the reactor, from where it can be efficiently removed by the auger 15 at the end of a batch. Such effective char removal avoids heat loss which would arise from insulating effects of char on the shell inner surface.

The reactor arrangement allows for very quick batch changes. This is because the auger 15 direction is simply reversed to drive the char out. The char may be delivered into a cooling vessel such as an auger with a cooling jacket. This may bring the temperature down from above 400° C. to below 50° C. for example. The arrangement of the rotating blades and the lower inlet/outlet with the auger achieves near complete char removal, without a delay for char cooling.

Also, by having a single inlet/outlet there is less risk of ingress of air, and hence $O_2$, into the chamber.

Figures 3A, 3B:
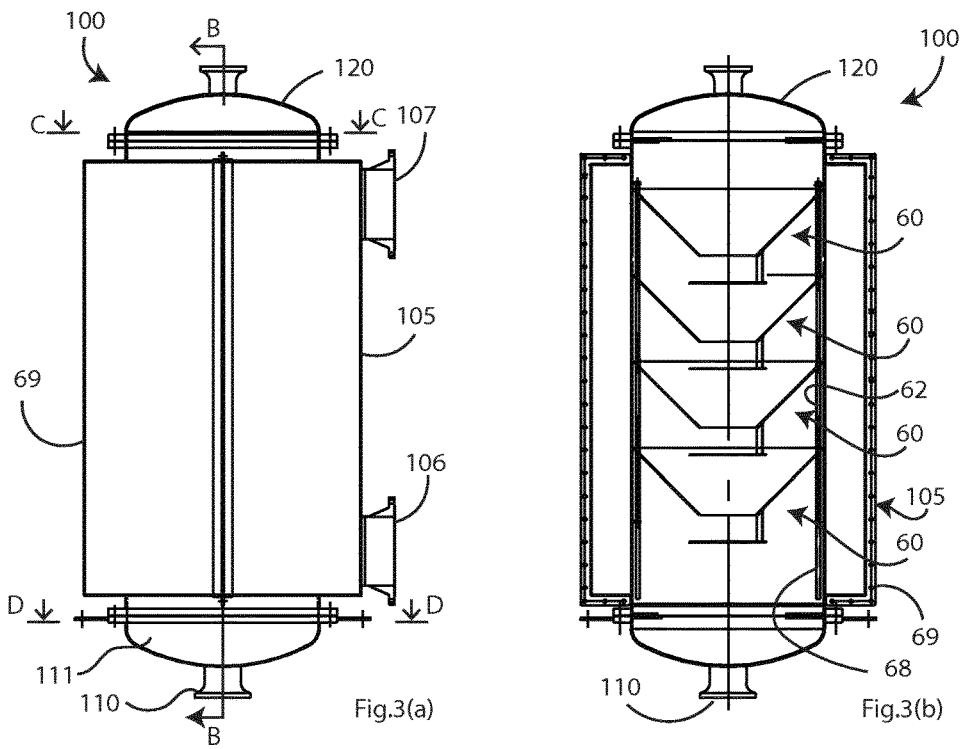
Figure 3C:
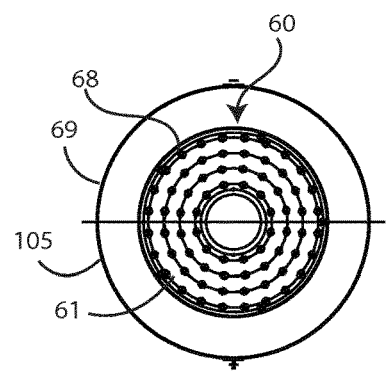
Figure 3D:
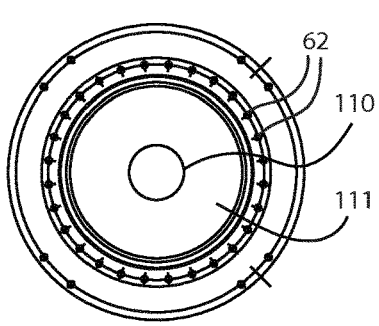
Figure 4A:
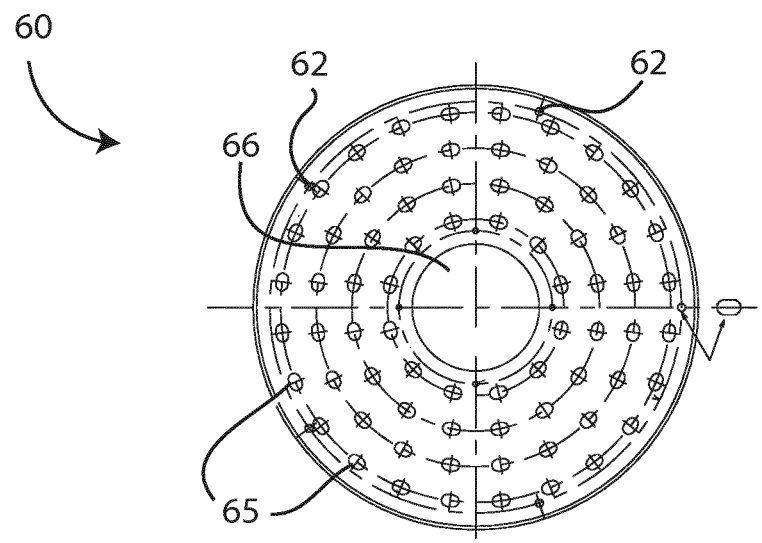
FIG. 4(a) is a plan view of a contactor element.
Figure 4B:
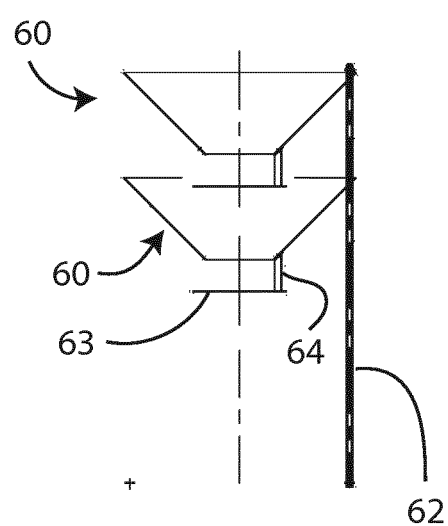
FIG. 4(b) is a diagram showing mounting of the elements.
Figure 5A:
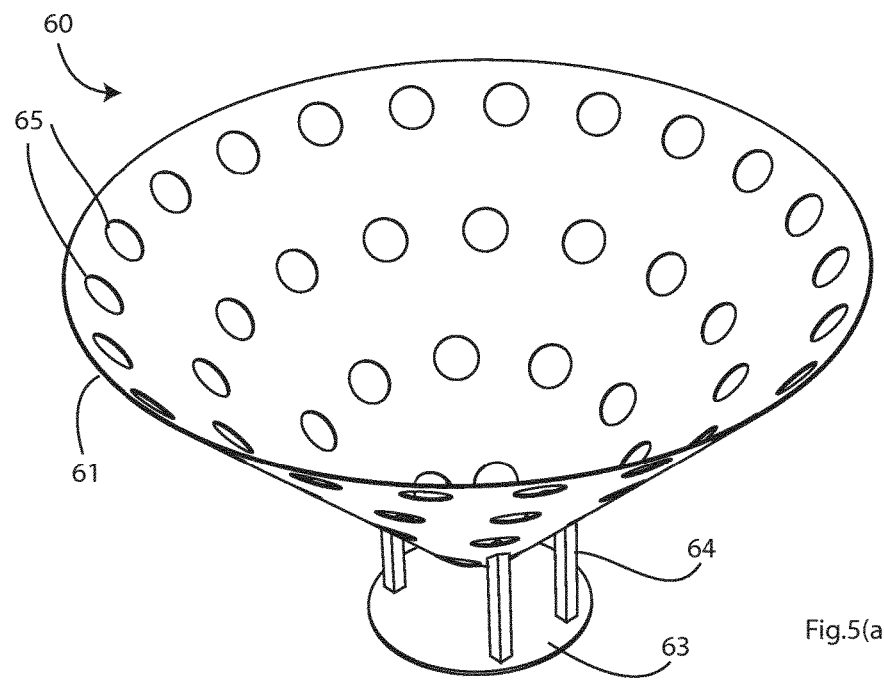
FIG. 5(a) is a perspective view of a contactor element.
Figure 5B:
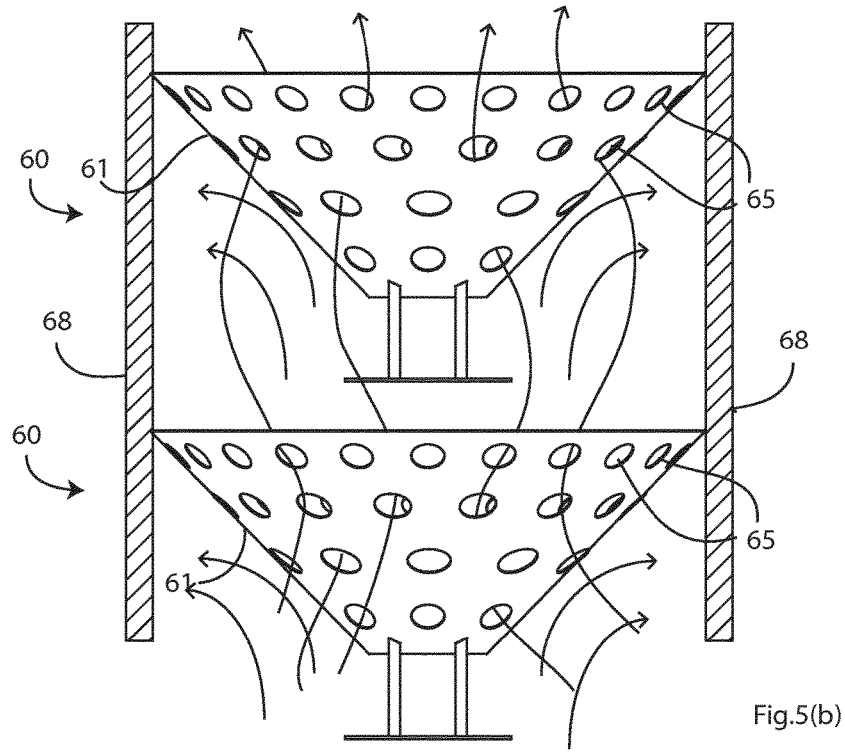
FIG. 5(b) is a diagrammatic side view illustrating operation of the contactor elements.

Referring to FIGS. 3 to 5 the contactor 100 is preferably used with the reactor 1 for the purposes of allowing short-chain gas components to pass through and to cause long-chain components to condense and fall back into the reactor 1. The contactor 100 could alternatively be used with a different pyrolysis reactor. A jacket 105 is formed between a vessel skin 68 and a jacket outer skin 69. Heat exchange air is pumped by a fan into the jacket 105 via a lower inlet 106 so that it circulates around the jacket 105 and exits via an upper jacket outlet 107 when heated. This provides temperature control of the space within the contactor 100, and importantly also, direct control of the contactor wall 68 temperature.

Pyrolysis gases rising from the reactor 1 enter the contactor 100 via an inlet 110 in a dome 111 and rise through four contactor elements 60 in the main body.

Each contactor element 60 comprises a frusto-conical plate 61 supported on vertical support arms 62, and being connected to a disc 63 by legs 64. The plate 61 is of metal perforated by apertures 65 of 40 mm diameter arranged in concentric rings about the longitudinal axis. The rings have 12, 16, 20, and 24 apertures in succession from the bottom up.

The lower contactor element 60 may preferably be of a metal having lower thermal conductivity than the upper element. This helps to reduce the temperature difference between them in use, the element closer to the pyrolysis gas inlet 110 being hotter as the gases enter the contactor 100 than at a higher level within it. For example, the lower one may be stainless steel while the upper one may be of Cu.

Referring to FIG. 6 the contactor may, in some embodiments have an upper section 200 with transverse heat exchange tubes 201 between manifolds 202. As shown, there may be two offset rows one above the other, or any desired number of sets.

In use, the pyrolysis gases rise up through the baffles provided by the contactor elements 60, contacting the discs 63 and the frusto-conical plates 61. The short-chain components successfully pass through the apertures 65 or the central holes 66 in the apexes. The long chains however will condense on one of these surfaces, or will alternatively be pushed to the sides to condense on the wall 68 internal surface by virtue of the orientation of the element plates 61. As described above, the wall is actively cooled by the jacket 105 and so they will condense on this surface if not on the contactor elements 60. This is an active temperature control to optimise operation of the contactor to tune the overall system according to the desired end product.

If an upper heat exchanger, such as the heat exchanger 200, is provided there may also be condensing of the long-chain components on the heat exchange tubes. Hence this heat exchanger has the dual functionality of providing final condensing of residual long chain pyrolysis gas components, and also providing a uniform temperature for the exiting gases. The latter is very advantageous for effectiveness of the downstream distillation processes. Also the outlet (to the distillation column) may be longer than illustrated, providing a still further surface for condensing of the long-chain components.

It will be appreciated that the contactor 1 provides very effective return of the long-chain components, and the cut-off point may be chosen by choice of temperature of the coolant air or other fluid pumped into the jacket 105.

Operation of the Contactor as a Filter

The temperature control and the arrangement of the contactor elements cause the contactor 100 to operate as a filter governing the chain lengths of gas passing into the downstream part of the process. This achieves tuning of the system to produce a desired end product.

The filtration is controlled, dynamically or by batch by:
(a) control of temperature of the space within the contactor chamber, and/or
(b) control of pressure within the chamber.

The temperature control is by control of the fluid in the jacket 105. The pressure control (b) is achieved in one embodiment by a gas blower downstream of the contactor.

The size of molecules which pass through to the outlet 120 is in general terms controlled according to:

Higher molecule size: higher temperature, lower pressure.
Lower molecule size: lower temperature, higher pressure.

The following is a table showing representative data:

| Temperature at top of contactor (° C.) | Alkane carbon range observed | Centre Carbon range |
|---|---|---|
| 135 to 145 | C4 to C16 | C6 |
| 170 to 180 | C4 to C17 | C6 |
| 195 to 205 | C4 to C18 | C10 |
| 220 to 230 | C4 to C21 | C11 |
| 250 to 255 | C4 to C22 | C12 |
| 291 to 292 | C4 to C22 | C13 |
| Target (diesel) | C8 to C24 | C16 |

In general, the preferred temperature range is 240° C. to 320° C., and the preferred pressure range is −150 mBar to +350 mBar.

The pressure and temperature control of the space within the contactor allows tuning of a conversion plant incorporating the reactor and the contactor across a wide range of end products. These include for example fuels and feedstock for plastics and lubricant products. Such feedstock may include waxes.

Figure 7:
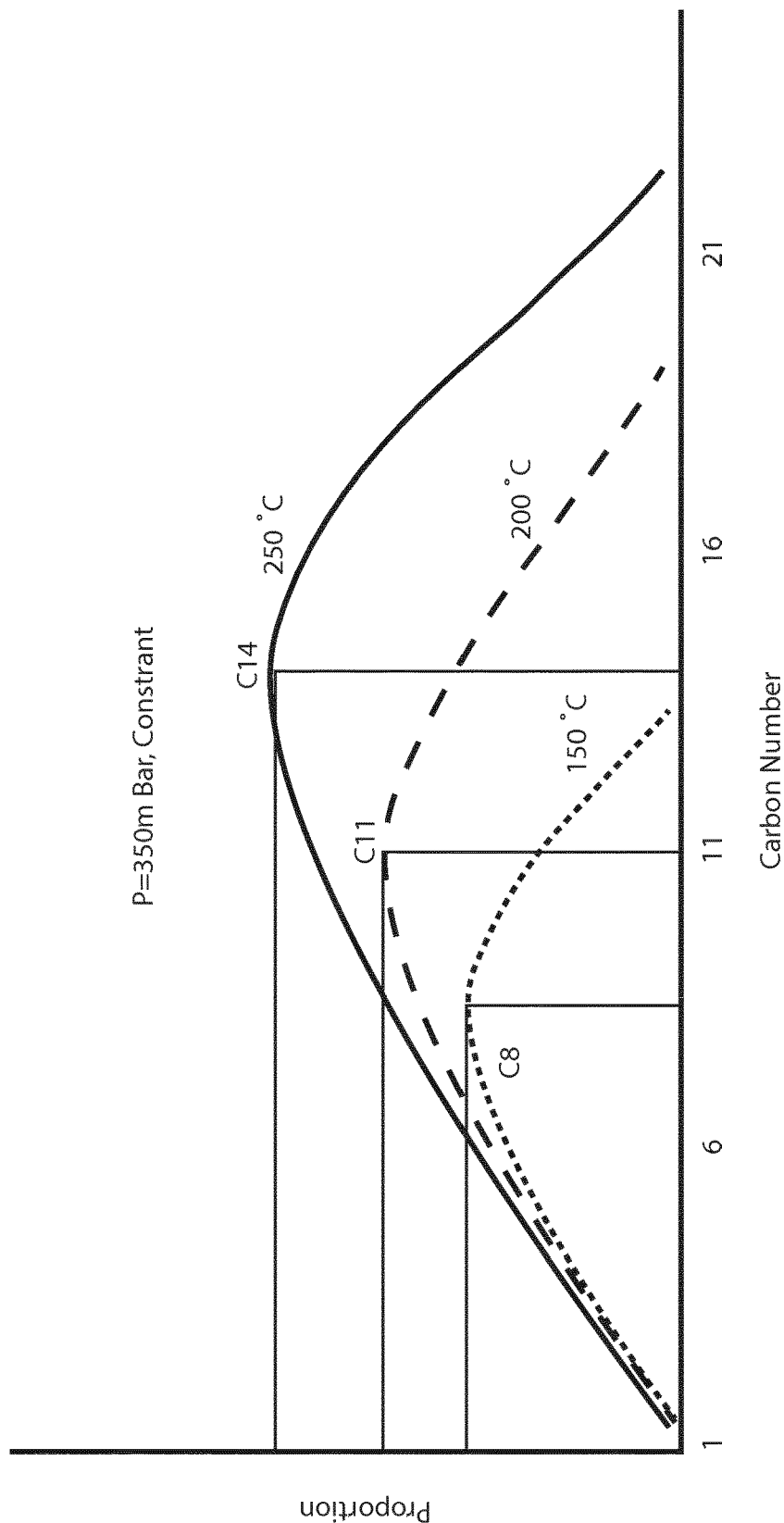
FIGS. 7 and 8 are plots illustrating operating parameters of s system incorporating the reactor of FIG. 1 and the contactor of FIG. 3.
Figure 8:
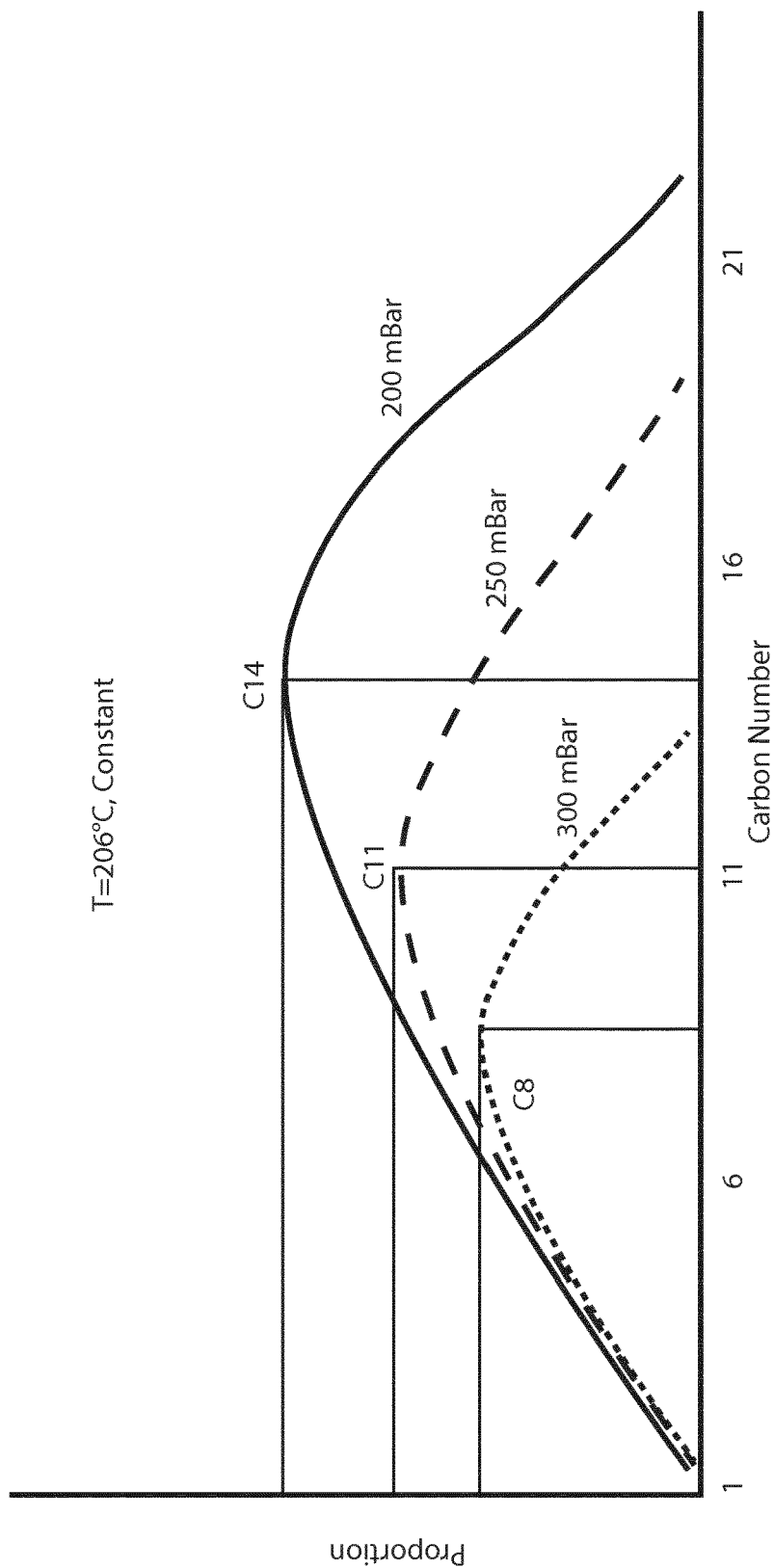

Referring to FIGS. 7 and 8 some representative examples are illustrated. As shown in FIG. 7 for an outlet temperature of 150° C. distribution of carbon number of gases which pass through is centered on C8, for 200° C. it is C11, and for 250° C. it is C14. The pressure is constant, about 350 mBar.

Referring to FIG. 8 a set of plots are shown for a constant temperature of 260° C. and pressures of 200 mBar, 250 mBar, and 300 mBar. There is a greater residence for a greater pressure, and hence the same overall effect is achieved as for varying temperature. The pressure of 200 mBar yielded a distribution centered on C14, of 250 mBar C11, and of 300 mBar C14.

It is envisaged that these distribution plots may be narrower with more experimentation with temperature and pressure control with different feedstock materials.

Varying temperature only has the advantage that it can be done locally at the contactor. On the other hand pressure control requires control of pressure of downstream components also.

The local temperature control is very effective because the longer chains tend to be forced upwardly and radially towards the wall 68 internal surface, causing condensation on this surface. For much of the condensation the conical-shaped plates 61 act as guides to gradually cool the gases and direct the longer chains towards the wall 68. The shorter chains tend to pass through the elements 60 at a level tuned according to contactor temperature and pressure.

Also, it has been found that the contactor element configuration achieves self-washing of the plate 61 surfaces due to flow of the condensed chains.

It is preferable that there are at least two, and more preferably at least three contactor elements.

It will be appreciated that the invention achieves much greater control of pyrolysis. It effectively extends a pyrolysis reactor to achieve tuning of an overall plant with downstream distillation columns, to produce a selected product. This is particularly advantageous where the feedstock varies in nature to a large extent, such as waste tyre rubber feedstock.

The invention is not limited to the embodiments described but may be varied in construction and detail. For example, it is envisaged that the contactor may be used with a conventional reactor, and vice versa. Also, the contactor elements may have different shapes, such as perforated flat plates angled upwardly and outwardly.

The invention claimed is:

1. A pyrolysis reactor system comprising a reactor and a contactor mounted above the reactor, wherein the contactor comprises at least one contactor element mounted within a vessel having a wall with an internal surface and being arranged for the flow of gas components back into the reactor,
    wherein the contactor elements include at least one perforated element which is sloped upwardly and radially towards the vessel wall,
    wherein:
    the vessel has a jacket surrounding the contactor element or elements,
    said jacket has a lower inlet and an upper outlet and a pump for pumping a heat exchange fluid into and around the jacket,
    at least one perforated contactor element has a frusto-conical shaped component, with its apex facing downwards towards the reactor, in which an upper edge is adjacent said internal surface and there is a baffle plate mounted below the apex, and
    the reactor system further comprises a temperature controller configured to pump coolant into the jacket inlet at a temperature chosen according to desired carbon chain length condensation within the contactor, and a pressure controller configured to control pressure in the contactor according to said desired carbon chain length condensation within the contactor.

2. The pyrolysis reactor system as claimed in claim 1, wherein said baffle plate is disc-shaped.

3. The pyrolysis reactor system as claimed in claim 1, wherein there are two or more contactor elements.

4. The pyrolysis reactor system as claimed in claim 1, wherein the reactor is arranged with a longitudinal axis directed upwardly towards the contactor, and a feedstock inlet is at its lower end, and wherein the reactor comprises an auger arranged to deliver feedstock into the reactor vessel when rotating in one direction, and for delivering char out through the feedstock inlet when rotating in the opposite direction.

5. The pyrolysis reactor system as claimed in claim 1, wherein the reactor comprises agitation blades for rotating on a central shaft in close proximity to a reactor vessel inner surface at a lower end of the reactor.

6. The pyrolysis reactor system as claimed in claim 5, wherein there are counter-helical agitation blades.

7. The pyrolysis reactor system as claimed in claim 5, wherein the agitation blades are supported on radial arms.

8. The pyrolysis reactor system as claimed in claim 1, wherein the reactor comprises agitation blades for rotating on a central shaft in close proximity to a reactor vessel inner surface at a lower end of the reactor, and wherein the agitation blades are supported on radial arms, and wherein the agitation blades only extend upwardly for a limited part of the longitudinal axis from the feedstock inlet.

9. The pyrolysis reactor system as claimed in claim 1, wherein the reactor comprises agitation blades for rotating on a central shaft in close proximity to a reactor vessel inner surface at a lower end of the reactor, and wherein a lower blade is arranged to scrape char from a lower domed vessel wall.

10. The pyrolysis reactor system as claimed in claim 1, wherein the reactor comprises agitation blades for rotating on a central shaft in close proximity to a reactor vessel inner surface at a lower end of the reactor, and wherein a lower blade is arranged to scrape char from a lower domed vessel wall, and wherein said lower blade is supported by radial arms extending from a central shaft and by brackets extending in the longitudinal direction from the lower blade to a radial arm at a location on said radial arm between the shaft and the vessel wall.

11. The pyrolysis reactor system as claimed in claim 1, wherein the reactor comprises agitation blades for rotating on a central shaft in close proximity to a reactor vessel inner surface at a lower end of the reactor, and wherein a lower blade is arranged to scrape char from a lower domed vessel wall, and wherein the reactor outlet is offset from the longitudinal axis.

12. A method of operation of a reactor system comprising a reactor and a contactor mounted above the reactor, wherein the contactor comprises at least one contactor element mounted within a vessel having a wall and being arranged for flow of gas components back into the reactor, wherein the contactor elements include at least one perforated element which is sloped upwardly and radially towards the vessel wall, wherein the vessel has a jacket surrounding the contactor element or elements, and wherein the jacket has a lower inlet and an upper outlet and a pump for pumping a heat exchange fluid into and around the jacket, the method comprising the controller:
dynamically tuning composition of outlet gases according to molecular string size by controlling contactor temperature and pressure, and in which said tuning comprises increasing temperature and decreasing pressure to achieve longer length chains of gas components.

13. The method as claimed in claim 12, wherein the temperature control is performed within a temperature range of 240° C. to 300° C.

14. The method as claimed in claim 12, wherein the pressure control is performed within a pressure range of −150 mBar to +350 mBar.

15. The method as claimed in claim 12, wherein the pressure control is achieved by management of back-pressure downstream of the contactor.

* * * * *